United States Patent
Huelke et al.

(10) Patent No.: US 9,463,735 B1
(45) Date of Patent: Oct. 11, 2016

(54) VEHICLE VISOR ASSEMBLY WITH ILLUMINATING CHECK ASSEMBLY

(71) Applicant: Ford Global Technologies, LLC, Dearborn, MI (US)

(72) Inventors: David R. Huelke, Milan, MI (US); John Andrew Stakoe, Bloomfield Hills, MI (US); Scott Holmes Dunham, Reford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/876,233

(22) Filed: Oct. 6, 2015

(51) Int. Cl.
| B60Q 1/00 | (2006.01) |
| B60Q 1/26 | (2006.01) |
| B60Q 3/02 | (2006.01) |
| B60J 3/02 | (2006.01) |

(52) U.S. Cl.
CPC ............ B60Q 3/0226 (2013.01); B60J 3/0252 (2013.01)

(58) Field of Classification Search
CPC .... B60J 3/0252; B60Q 3/008; B60Q 3/0209; B60Q 3/0226; B60Q 3/0279; B60Q 3/0283; B60Q 3/0286; B60Q 3/0296; B60Q 3/044
USPC ......................................... 362/492, 509–510
See application file for complete search history.

(56) References Cited

U.S. PATENT DOCUMENTS

| 5,065,970 | A | 11/1991 | Gross |
| 5,709,453 | A | 1/1998 | Krent et al. |
| 6,117,362 | A | 9/2000 | Yen et al. |
| 6,577,073 | B2 | 6/2003 | Shimizu et al. |
| 6,729,738 | B2 | 5/2004 | Fuwausa et al. |
| 6,737,964 | B2 | 5/2004 | Samman et al. |
| 6,773,129 | B2 | 8/2004 | Anderson et al. |
| 6,820,888 | B1 | 11/2004 | Griffin |
| 6,851,840 | B2 | 2/2005 | Ramamurthy et al. |
| 6,859,148 | B2 | 2/2005 | Miller |
| 6,871,986 | B2 | 3/2005 | Yamanaka et al. |
| 6,953,536 | B2 | 10/2005 | Yen et al. |
| 6,990,922 | B2 | 1/2006 | Ichikawa et al. |
| 7,161,472 | B2 | 1/2007 | Strumolo et al. |
| 7,213,923 | B2 | 5/2007 | Liu et al. |
| 7,264,366 | B2 | 9/2007 | Hulse |
| 7,264,367 | B2 | 9/2007 | Hulse |
| 7,441,914 | B2 | 10/2008 | Palmer et al. |
| 7,745,818 | B2 | 6/2010 | Sofue et al. |
| 7,753,541 | B2 | 7/2010 | Chen et al. |
| 7,834,548 | B2 | 11/2010 | Jousse et al. |
| 7,862,220 | B2 | 1/2011 | Cannon et al. |
| 7,987,030 | B2 | 7/2011 | Flores et al. |

(Continued)

FOREIGN PATENT DOCUMENTS

| CN | 101337492 A | 1/2009 |
| CN | 201169230 Y | 2/2009 |

(Continued)

*Primary Examiner* — Jason Moon Han
(74) *Attorney, Agent, or Firm* — Vichit Chea; Price Heneveld LLP (57) ABSTRACT

A visor assembly of a vehicle is provided herein. A visor body is pivotally coupled to a vehicle roof structure and has a securing portion. A bracket of a check assembly is coupled to the vehicle roof structure and has a clasp for removably engaging the securing portion. A tab of the check assembly extends from the bracket for holding an informational item and has a luminescent portion adapted to luminesce in response to excitation light.

20 Claims, 5 Drawing Sheets

(56) References Cited

U.S. PATENT DOCUMENTS

| | | |
|---|---|---|
| 8,016,465 B2 | 9/2011 | Egerer et al. |
| 8,022,818 B2 | 9/2011 | la Tendresse et al. |
| 8,071,988 B2 | 12/2011 | Lee et al. |
| 8,097,843 B2 | 1/2012 | Agrawal et al. |
| 8,136,425 B2 | 3/2012 | Bostick |
| 8,163,201 B2 | 4/2012 | Agrawal et al. |
| 8,178,852 B2 | 5/2012 | Kingsley et al. |
| 8,197,105 B2 | 6/2012 | Yang |
| 8,203,260 B2 | 6/2012 | Li et al. |
| 8,207,511 B2 | 6/2012 | Bortz et al. |
| 8,232,533 B2 | 7/2012 | Kingsley et al. |
| 8,247,761 B1 | 8/2012 | Agrawal et al. |
| 8,286,378 B2 | 10/2012 | Martin et al. |
| 8,408,766 B2 | 4/2013 | Wilson et al. |
| 8,415,642 B2 | 4/2013 | Kingsley et al. |
| 8,421,811 B2 | 4/2013 | Odland et al. |
| 8,466,438 B2 | 6/2013 | Lambert et al. |
| 8,519,359 B2 | 8/2013 | Kingsley et al. |
| 8,519,362 B2 | 8/2013 | Labrot et al. |
| 8,552,848 B2 | 10/2013 | Rao et al. |
| 8,567,649 B1 | 10/2013 | Cabak |
| 8,606,430 B2 | 12/2013 | Seder et al. |
| 8,624,716 B2 | 1/2014 | Englander |
| 8,631,598 B2 | 1/2014 | Li et al. |
| 8,664,624 B2 | 3/2014 | Kingsley et al. |
| 8,678,468 B2 | 3/2014 | Huelke et al. |
| 8,683,722 B1 | 4/2014 | Cowan |
| 8,724,054 B2 | 5/2014 | Jones |
| 8,773,012 B2 | 7/2014 | Ryu et al. |
| 8,846,184 B2 | 9/2014 | Agrawal et al. |
| 8,952,341 B2 | 2/2015 | Kingsley et al. |
| 9,057,021 B2 | 6/2015 | Kingsley et al. |
| 9,065,447 B2 | 6/2015 | Buttolo et al. |
| 9,299,887 B2 | 3/2016 | Lowenthal et al. |
| 2002/0159741 A1 | 10/2002 | Graves et al. |
| 2002/0163792 A1 | 11/2002 | Formoso |
| 2003/0179548 A1 | 9/2003 | Becker et al. |
| 2004/0118885 A1 | 6/2004 | Turner |
| 2004/0213088 A1 | 10/2004 | Fuwausa |
| 2006/0087826 A1 | 4/2006 | Anderson, Jr. |
| 2007/0032319 A1 | 2/2007 | Tufte |
| 2007/0285938 A1 | 12/2007 | Palmer et al. |
| 2008/0054670 A1 | 3/2008 | Foster et al. |
| 2009/0219730 A1 | 9/2009 | Syfert et al. |
| 2009/0251920 A1 | 10/2009 | Kino et al. |
| 2009/0262515 A1 | 10/2009 | Lee et al. |
| 2011/0012062 A1 | 1/2011 | Agrawal et al. |
| 2012/0001406 A1 | 1/2012 | Paxton et al. |
| 2012/0104954 A1 | 5/2012 | Huang |
| 2012/0183677 A1 | 7/2012 | Agrawal et al. |
| 2012/0280528 A1 | 11/2012 | Dellock et al. |
| 2013/0335994 A1 | 12/2013 | Mulder et al. |
| 2014/0065442 A1 | 3/2014 | Kingsley et al. |
| 2014/0103258 A1 | 4/2014 | Agrawal et al. |
| 2014/0264079 A1 | 9/2014 | Tarahomi et al. |
| 2014/0264396 A1 | 9/2014 | Lowenthal et al. |
| 2014/0266666 A1 | 9/2014 | Habibi |
| 2014/0373898 A1 | 12/2014 | Rogers et al. |
| 2015/0046027 A1 | 2/2015 | Sura et al. |
| 2015/0138789 A1 | 5/2015 | Singer et al. |
| 2015/0267881 A1 | 9/2015 | Salter et al. |
| 2016/0016506 A1 | 1/2016 | Collins et al. |

FOREIGN PATENT DOCUMENTS

| | | |
|---|---|---|
| CN | 201193011 Y | 2/2009 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| WO | 2006047306 A1 | 5/2006 |
| WO | 2014068440 A1 | 5/2014 |

VEHICLE VISOR ASSEMBLY WITH ILLUMINATING CHECK ASSEMBLY

FIELD OF THE INVENTION

The present invention generally relates to visor assemblies for vehicles and, more particularly, visor assemblies that incorporate item holding devices.

BACKGROUND OF THE INVENTION

It is generally known to adapt a visor assembly to a portion of a vehicle frame above the vehicle's front windshield. Further, such visor assemblies are adapted to block light rays, such as ultraviolet (UV) rays or vehicle headlight rays, from potentially dazzling the driver of the vehicle.

SUMMARY OF THE INVENTION

According to one aspect of the present invention, a visor assembly of a vehicle is provided. A visor body is pivotally coupled to a vehicle roof structure and has a securing portion. A bracket of a check assembly is coupled to the vehicle roof structure and has a clasp for removably engaging the securing portion. A tab of the check assembly extends from the bracket for holding an informational item and has a luminescent portion adapted to luminesce in response to excitation light.

According to another aspect of the present invention, a visor assembly of a vehicle is provided. A visor body is pivotally coupled to a vehicle roof structure and has a securing portion. A bracket of a check assembly is coupled to the vehicle roof structure and has a clasp for removably engaging the securing portion. A tab of the check assembly extends from the bracket for holding an informational item and has a luminescent portion adapted to luminesce in response to excitation light. A light source supplies excitation light to the luminescent portion.

According to yet another aspect of the present invention, a check assembly for removably engaging a visor is provided. A bracket is coupled to a vehicle roof structure. A tab extends from the bracket for holding an informational item and has a luminescent portion adapted to luminesce in response to excitation light. A light source supplies excitation light to the luminescent portion.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein. However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-8, reference numeral 10 generally designates a visor assembly of a vehicle 12. The visor assembly 10 includes an elongated support member 14 that has a pivot end 16, an intermediate portion 18, and a securing end 20. The pivot end 16 pivotally couples with a roof structure 22 (e.g., a headliner) of the vehicle 12. A visor body 24 is coupled with the elongated support member 14 such that the intermediate portion 18 extends within an edge portion 26 of the visor body 24. The visor body 24 is operable between a deployed position 28 and a non-deployed position 30. The visor assembly 10 also includes a check assembly 32 that has a bracket 34 coupled to the roof structure 22 of the vehicle 12. The bracket 34 includes a clasp 36 that removably engages the securing end 20 of the elongated support member 14. A tab 38 extends from the bracket 34 and is adapted to hold an informational item 40. The tab 38 generally concealed between the visor body 24 and the roof structure 22 when the visor body 24 is in the non-deployed position 30.

Figure 1:
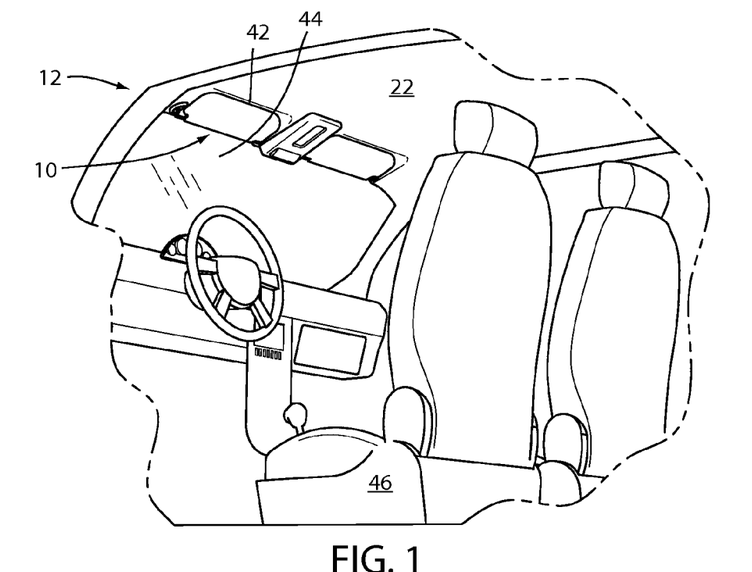
FIG. 1 is a side perspective view of a vehicle of the present invention with a door in an open position.

As illustrated in FIG. 1, the visor assembly 10 is typically coupled to a portion 42 of the roof structure 22 that is located above a front windshield 44 of the vehicle 12. However, the visor assembly 10 is contemplated to be in other orientations and disposed at alternative positions within a vehicle. A user of the visor assembly 10 is typically seated in a front occupant seat 46 within the vehicle 12.

Figure 2:
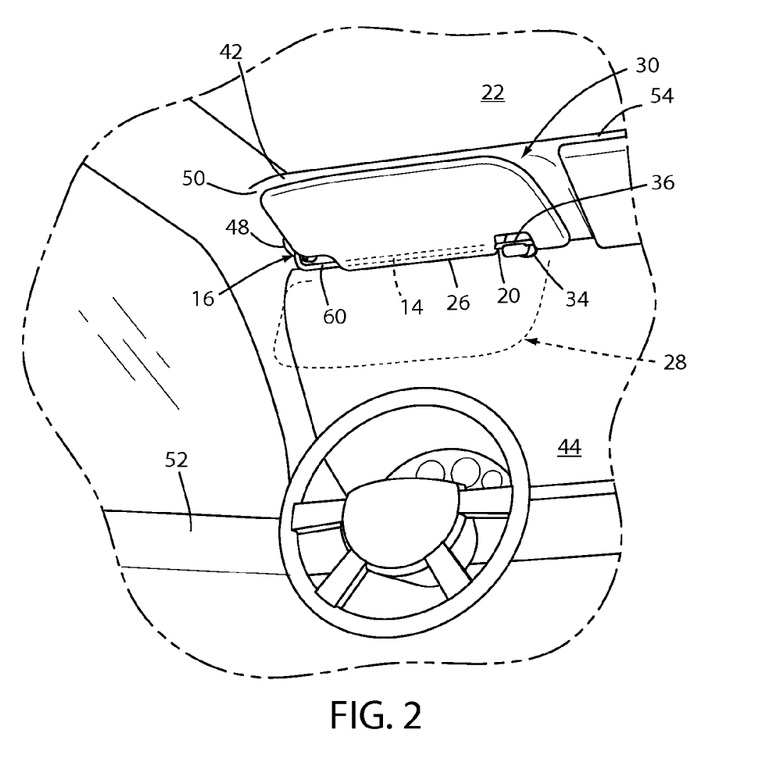
FIG. 2 is a front perspective view of a driver's side compartment showing a vehicle headliner and a visor assembly of the present invention in the non-deployed position.
Figure 3:
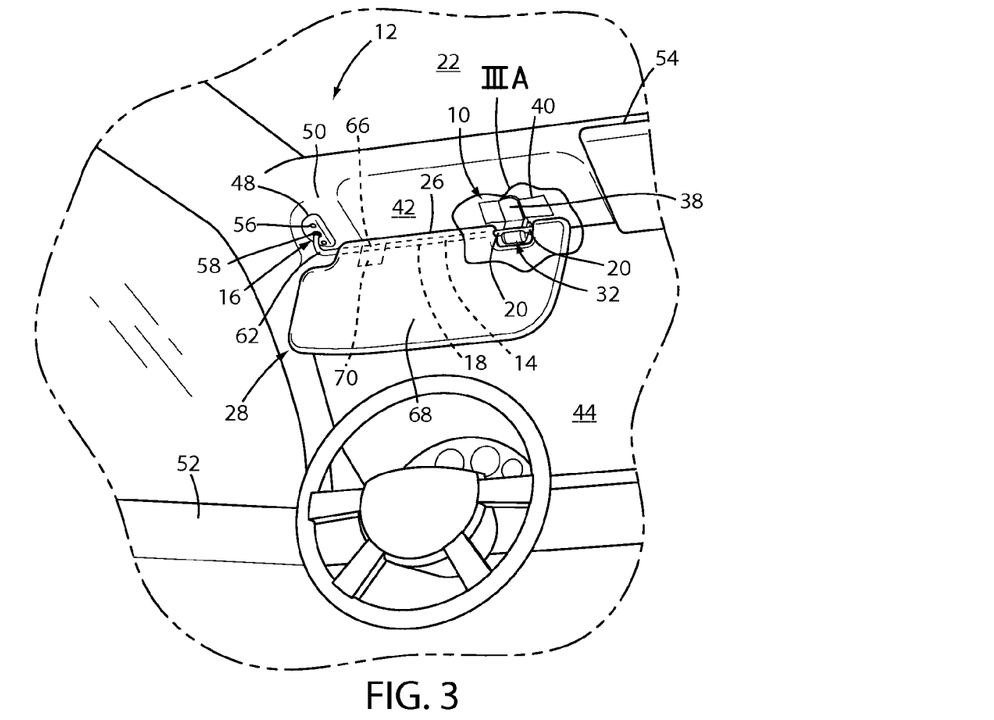
FIG. 3 is a front perspective view of a driver's side compartment showing a vehicle headliner and a visor assembly of the present invention in the deployed position.
Figure 3A:
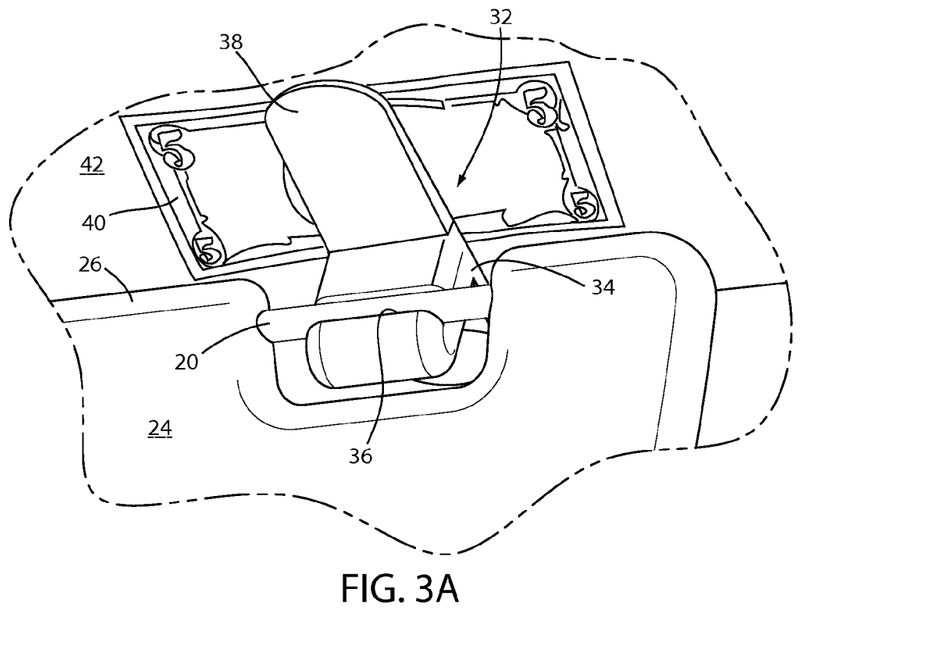
FIG. 3A is a front enlarged partial perspective view of the visor assembly of area IIIA of FIG. 3, marked as IIIA.
Figure 4:
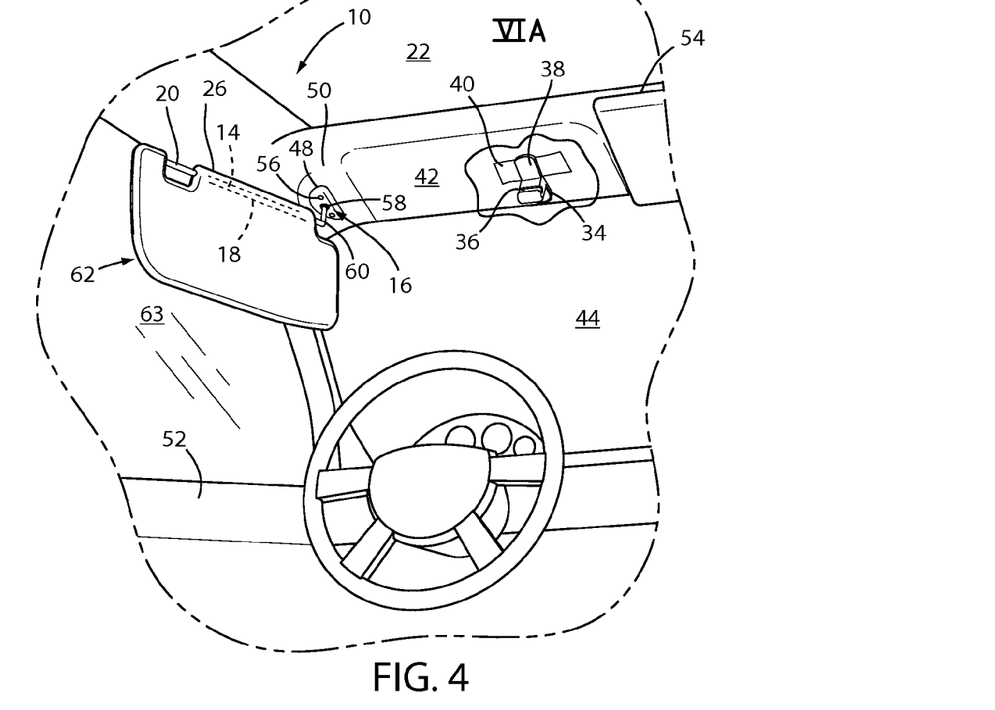
FIG. 4 is a front perspective view of a driver's side compartment showing a vehicle headliner and a visor assembly of the present invention in the deployed position and detached from the check assembly.

Referring now to FIGS. 2-4A, the elongated support member 14 includes the pivot end 16, the intermediate portion 18, and the securing end 20. The pivot end 16 pivotally couples with the roof structure 22 of the vehicle 12. More specifically, the pivot end 16 has a mounting bracket 48 that is fixedly coupled with an outside portion 50 of the roof structure 22. The outside portion 50 of the roof structure 22 is defined by the portion of the roof structure 22 near a side door 52, away from a general center 54 of the vehicle 12. The mounting bracket 48 is fixedly secured using at least one mounting fastener 56, such as a screw or bolt. The mounting bracket 48 has a socket 58 formed therein. The pivot end 16 of the elongated support member 14 includes a pivoting rod 60 that engages the socket 58 of the mounting bracket 48, allowing for pivotal movement therein. The socket 58 of the mounting bracket 48 is adapted to allow for pivotal movement of the pivot rod 60, wherein the pivot rod 60 may be pivoted and frictionally held in various locations by the socket 58. For example, as illustrated in FIG. 4, the pivot rod 60 may be manipulated to move the visor body 24 to deployed position 62, where it is detached from the check assembly 32 and may function to block light rays incoming from side window 63 located above door 52. The pivot rod 60 is an integral piece of the elongated support member 14 and extends to the intermediate portion 18 thereof. However, it is contemplated that the pivot rod 60 may be a separate piece, and further that the pivot end 16 may be pivotally coupled with the roof structure 22 in an alternate arrangement that that illustrated and described herein.

As shown in FIG. 3, the visor body 24 of the visor assembly 10 is coupled with the elongated support member 14 about the intermediate portion 18 thereof. The visor body 24 has a substantially flat rectangular shape and may be constructed to have varying thickness. The visor body 24 includes edge portion 26 with a cylindrical channel 66 formed therein for receiving the intermediate portion 18 of the elongated support member 14. The securing end 20 of the elongated support member 14 extends beyond the intermediate portion 18 and beyond the edge portion 26 of the visor body 24. The securing end 20 is exposed and not engaged with the cylindrical channel 66 of the edge portion 26.

As shown in FIGS. 2 and 3, the visor body 24 is operable between deployed and non-deployed positions 28, 30. The visor body 24 may be rotated about the intermediate portion 18 of the elongated support member 14 to transition between the deployed position 28 and the non-deployed position 30. In the non-deployed position 30, an upper surface 68 of the visor body 24 is in abutting contact with portion 42 of the roof structure 22. Alternatively, in the deployed position 28, the visor body 24 is rotated down about the intermediate portion 18 of the elongated support member 14, thereby exposing the upper surface 68 of the visor body 24 to a user sitting in the front occupant seat 46 (FIG. 1) of the vehicle 12. While not shown, it is contemplated that various devices such as a vanity mirror and lights may be provided on the upper surface 68 of the visor body 24. In the deployed position 28, the visor body 24 may be used for blocking light rays from the user's field of vision. A frictional or spring biased positioning device 70 is disposed within the visor body 24 adjacent to the cylindrical channel 66 and engages the elongated support member 14. The positioning device 70 allows the visor body 24 to be pivoted at various angles about the intermediate portion 18 of the elongated support member 14 and stabilize the visor body 24 in such positions, which include the deployed and non-deployed positions 28, 30.

Figure 5:
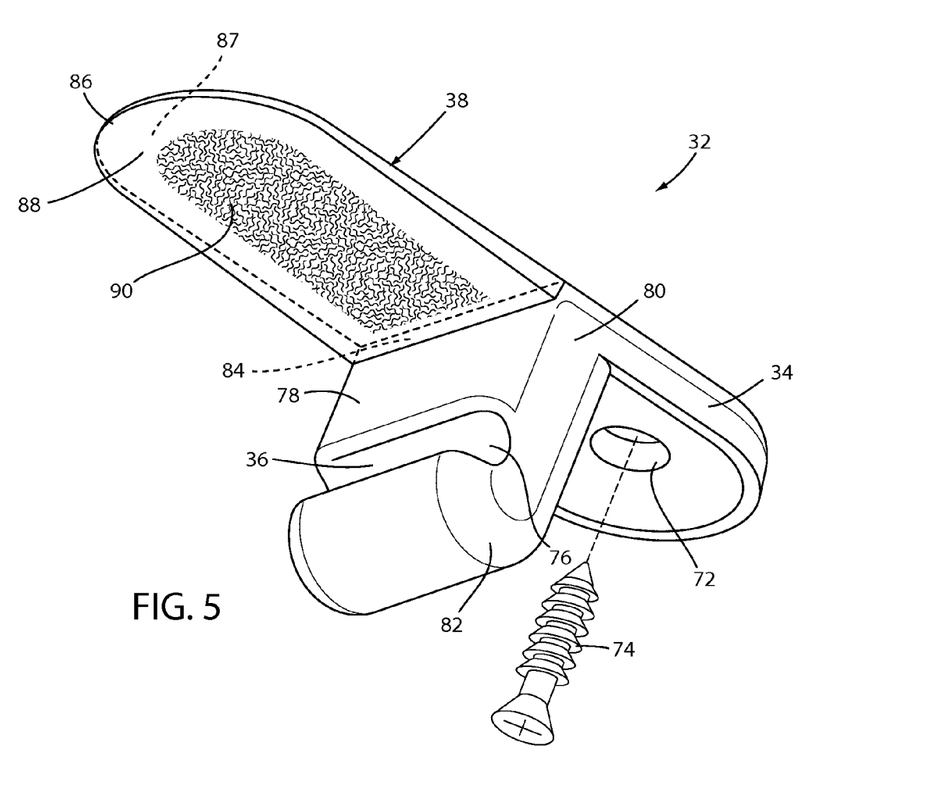
FIG. 5 is a side perspective view of a check assembly of the present invention.

Referring now to FIG. 5, the check assembly 32 is shown and includes the bracket 34, clasp 36, and tab 38, as described herein. The bracket 34 is coupled to the roof structure 22 of the vehicle 12 and includes an aperture 72 for receiving a fastener 74, such as a screw or bolt. The fastener 74 couples with and extends through the aperture 72 into the roof structure of the vehicle 12 to fixedly secure the bracket 34 thereto. The bracket 34 is secured toward the general center 54 of the roof structure 22, away from the outside portion 50 of the roof structure 22, at a distance from the pivot end 16 of the elongated support member 14 generally equal to a length of the intermediate portion 18 of the elongated support member 14 (FIG. 4). It is also conceived that the bracket 34 can be secured near the general center 54 of the roof structure 22 by more than one fastener 74 or by other fastening mechanisms, such as forming the bracket 34 with the roof structure 22 or using an adhesive.

Still referring to FIG. 5, the bracket 34 includes clasp 36 for removably engaging the securing end 20 of the elongated support member 14. The clasp 36 includes an arcuate groove 76 extending in parallel alignment with portion 42 of the roof structure 22 of the vehicle 12 (FIG. 4A) along an upper facing surface 78 of a bracket member 80 of the bracket 34. The bracket member 80 extends substantially orthogonal with respect to the bracket 34 and the roof structure 22 of the vehicle 12 to a rounded end 82 beyond the clasp 36. The arcuate groove 76 of the clasp 36 has a cross-section formed to compliment and engage with the securing end 20 of the elongated support member 14. Upon engaging the securing end 20 with the clasp 36, the rounded end 82 temporarily flexes so as to expand the opening of the arcuate groove 76 to allow the diameter of the securing end 20 to enter and frictionally engage with the arcuate groove 76. The securing end 20 of the elongated support member 14 may disengage from the clasp 36 and the visor body 24 may be pivoted about the pivot end 16 towards the side door 52, easily manipulated by the user, without the use of tools.

Figure 4A:
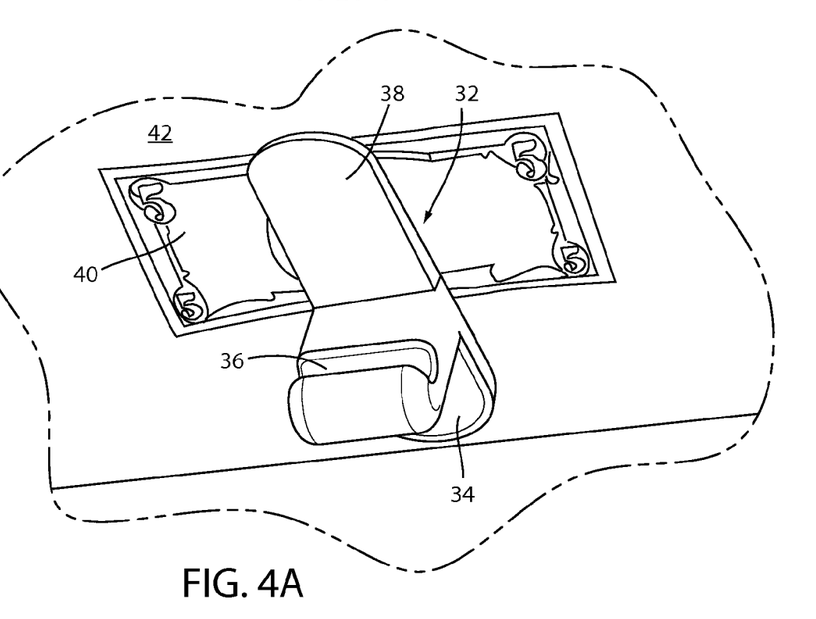
FIG. 4A is a front enlarged partial perspective view of the visor assembly of area IVA of FIG. 4.

As shown in FIG. 5, the tab 38 extends substantially orthogonally from a lower portion 84 of the upper facing surface 78 of the bracket member 80. The tab 38 has a substantially flat shape with a rounded end 86 located distally from the bracket member 80. However, it is contemplated that the tab 38 may be shaped differently than that shown and described herein. When the bracket 34 is secured to the roof structure 22 via fastener 74, an underside 87 of the tab 38 is in abutting contact with the roof structure 22. The tab 38 may be adapted to temporarily flex (if needed) to allow an informational item 40 to be inserted and held in place between the tab 38 and the roof structure 22 (FIG. 4A). When the visor body 24 is moved to a deployed position, such as deployed position 28, a topside 88 of the tab 38 is exposed and typically faces a user seated in the front occupant seat 46 within the vehicle 12. The topside 88 includes a luminescent portion 90 that is adapted to luminesce in response to excitation light, which may be supplied by natural (e.g., sunlight) or artificial light sources. For example, the luminescent portion 90 shown in FIG. 5 may be adapted to luminesce in response to UV light. Thus, when the luminescent portion 90 is exposed to sunlight, for instance, the luminescent portion 90 becomes energized. Over time, the stored energy is released, causing the luminescent portion 90 to emit light, which causes the tab 38 to have a glowing appearance.

With respect to the embodiments described herein, luminescent portion 90 occupies a substantial area of the topside 88 but may be configured in other dimensions, including shape and size. It is contemplated a substantial entirety of the tab 38 may be made to luminesce if desired. While generally shown as a strip, the luminescent portion 90 may otherwise be arranged as a symbol, icon, character(s), or the like. The luminescent portion 90 may be formed from materials having phosphorescent or fluorescent properties and may luminesce according to the principles of down conversion or up conversion. Luminescent portion 90 may be integrated with the tab 38 through a molding process or otherwise arranged thereon as a coating, layer, film or other suitable deposition.

Figure 6:
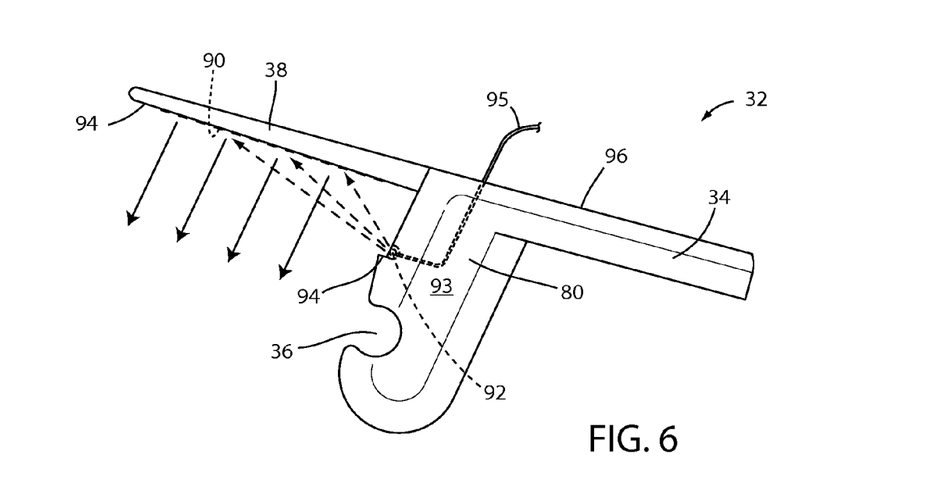
FIG. 6 is a side elevational view of another embodiment of a check assembly of the present invention.

Referring now to FIG. 6, another embodiment of the check assembly 32 is shown. The check assembly 32 may be constructed similarly to that shown in FIG. 5 with the addition of one or more light sources, exemplarily shown as light emitting diode (LED) 92, coupled to a central portion 93 of the bracket member 80. The LED 92 may be secured within a recessed portion 94 of the bracket member 80 such that it is hidden from the view of occupants within the vehicle 12. The LED 92 is arranged to flood the luminescent portion 90 with excitation light, demonstrated in FIG. 6 by the broken arrows, thereby causing the luminescent portion 90 to luminesce, as exemplarily demonstrated by the solid arrows. Thus, with respect to the presently illustrated embodiment, the luminescent portion 90 of the tab 38 is said to be front lit by virtue of the excitation light supplied by the LED 92 striking the front 94 of the luminescent portion 90. The LED 92 may be electrically connected to a wire 95 extending through the bracket member 80 and exiting therefrom through a base portion 96 of the bracket 34. The wire 95 may further extend into the roof structure 22 and is connected to a vehicle power supply or other power supply within the vehicle 12. In operation, the LED 92 may be controlled to automatically activate whenever the visor body 24 is moved to a deployed position and/or manually activated via a switch located within the vehicle 12.

Figure 7:
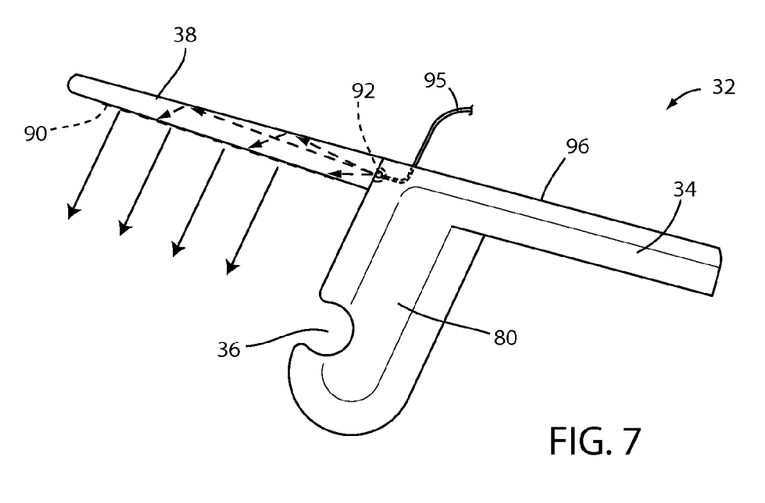
FIG. 7 is a side elevational view of yet another embodiment of a check assembly of the present invention.

In yet another alternative embodiment of the check assembly 32, as shown in FIG. 7, the LED 92 may be positioned in the base portion 96 of the bracket 34 and arranged to emit excitation light into the tab 38. In such a configuration, the tab 38 is substantially light transmissive and is configured to internally reflect the excitation light such that it is eventually received by the luminescent portion 90. As demonstrated in FIG. 7, excitation light emitted from the LED 92 is represented by broken arrows whereas converted light emitted from the luminescent portion 90 is represented by solid arrows. With respect to the presently illustrated embodiment, the luminescent portion 90 of the tab 38 is said to be backlit by virtue of the excitation light supplied by the LED 92 striking the rear 98 of the luminescent portion 90. The luminescent portion 90 may emit light expressed in a variety of colors and LED 92 may be electrically connected to a wire 95 extending through the bracket member 80 and exiting therefrom through the base portion 96 of the bracket 34. The wire 95 may further extend into the roof structure 22 and may be connected to a vehicle power supply or other power supply within the vehicle 12. In operation, the LED 92 may be controlled to automatically activate whenever the visor body 24 is moved to a deployed position and/or manually activated via a switch located within the vehicle 12.

With respect to the embodiments described in FIGS. 6 and 7, it is contemplated that the excitation light supplied to the luminescent portion 90 from LED 92 may include UV light or other light such as blue light, which has a relatively low perceptibility. The resultant converted light, emitted from the luminescent portion 90, may include any colored light generated via down conversion or up conversion. For example, it is contemplated that the luminescent portion 90 may be formulated to down convert excitation light such that the light emitted from the luminescent portion 90 may be expressed in a variety of colors such as red, green, blue, or combinations thereof. While the LED 92 has been shown in FIGS. 6 and 7 as being integrated with the bracket 34, it should be appreciated that the LED 92 or other light source may be located externally from the check assembly 32 and positioned on another vehicle structure to supply excitation light to the luminescent portion 90 of the tab 38.

Figure 8:
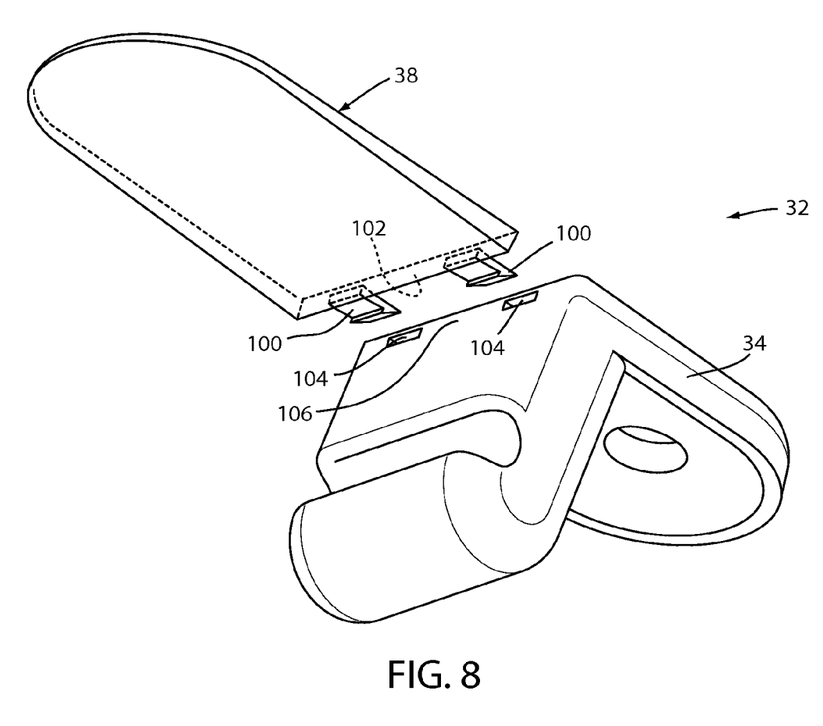
FIG. 8 illustrates a two piece design of a check assembly of the present invention.

The components of the check assembly 32, including the bracket 34, the clasp 36, and the tab 38 may be integrally formed as one single piece. However, it is contemplated that the components may also be formed as separate pieces in alternative embodiments. According to one embodiment, as shown in FIG. 8, the tab 38 and the bracket 34 may be formed separately. In assembly, the tab 38 may be snappedly engaged to the bracket 34. For example, the tab 38 includes one or more hooked protrusions 100 that extend outwardly from a securing end 102 of the tab 38 and are configured to be received within corresponding openings 104 in a receiving end 106 of the bracket 34 such that the tab 38 is snappedly engaged to the bracket 34. The check assembly 32 and its individual components may be made of a polymer material that provides the flexible capabilities outlined and described herein. The informational item 40 that is secured between the tab 38 and the roof structure 22 may include a ticket, a paper note, a card, a brochure, a pamphlet, a piece of currency, and the like. It is also contemplated that other small lightweight materials such as a writing utensil or a pair of sunglasses may also be secured between the tab 38 and the roof structure 22.

It will be understood by one having ordinary skill in the art that construction of the described invention and other components is not limited to any specific material. Other exemplary embodiments of the invention disclosed herein may be formed from a wide variety of materials, unless described otherwise herein.

For the purposes of describing and defining the present teachings, it is noted that the terms "substantially" and "approximately" are utilized herein to represent the inherent degree of uncertainty that may be attributed to any quantitative comparison, value, measurement, or other representation. The term "substantially" and "approximately" are also utilized herein to represent the degree by which a quantitative representation may vary from a stated reference without resulting in a change in the basic function of the subject matter at issue.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated. It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A visor assembly of a vehicle, comprising:
   a visor body pivotally coupled to a vehicle roof structure and having a securing portion; and
   a check assembly comprising:
      a bracket coupled to the vehicle roof structure and having a clasp for removably engaging the securing portion; and
      a tab extending from the bracket for holding an informational item and having a luminescent portion adapted to luminesce in response to excitation light.

2. The visor assembly of claim 1, further comprising a light source for supplying excitation light to the luminescent portion.

3. The visor assembly of claim 2, wherein the light source is located within the bracket.

4. The visor assembly of claim 3, wherein the luminescent portion of the tab is front lit by excitation light supplied from the light source.

5. The visor assembly of claim 3, wherein the luminescent portion of the tab is backlit by excitation light supplied from the light source.

6. The visor assembly of claim 1, wherein the luminescent portion comprises a substantial entirety of the tab.

7. The visor assembly of claim 1, wherein the tab is snappedly engaged to the bracket.

8. A visor assembly of a vehicle, comprising:
   a visor body pivotally coupled to a vehicle roof structure and having a securing portion; and
   a check assembly comprising:
      a bracket coupled to the vehicle roof structure and having a clasp for removably engaging the securing portion;
      a tab extending from the bracket for holding an informational item and having a luminescent portion adapted to luminesce in response to excitation light; and
      a light source for supplying excitation light to the luminescent portion.

9. The visor assembly of claim 8, wherein the luminescent portion of the tab is front lit by excitation light supplied from the light source.

10. The visor assembly of claim 8, wherein the luminescent portion of the tab is backlit by excitation light supplied from the light source.

11. The visor assembly of claim 8, wherein the luminescent portion comprises a substantial entirety of the tab.

12. The visor assembly of claim 8, wherein the luminescent portion is integrated with the tab via a molding process.

13. The visor assembly of claim 8, wherein the tab is snappedly engaged to the bracket.

14. A check assembly for removably engaging a visor, comprising:
   a bracket coupled to a vehicle roof structure and configured to engage the visor;
   a tab extending from the bracket for holding an informational item and having a luminescent portion adapted to luminesce in response to excitation light; and
   a light source for supplying excitation light to the luminescent portion.

15. The visor assembly of claim 14, wherein the luminescent portion of the tab is front lit by excitation light supplied from the light source.

16. The visor assembly of claim 14, wherein the luminescent portion of the tab is backlit by excitation light supplied from the light source.

17. The visor assembly of claim 14, wherein the luminescent portion comprises a substantial entirety of the tab.

18. The visor assembly of claim 14, wherein light source is disposed to emit excitation light into the tab.

19. The visor assembly of claim 18, wherein the tab is configured to internally reflect the excitation light such that it is eventually received by the luminescent portion.

20. The visor assembly of claim 14, wherein the tab is snappedly engaged to the bracket.

* * * * *